United States Patent
Shin et al.

(10) Patent No.: US 8,948,079 B2
(45) Date of Patent: Feb. 3, 2015

(54) RELAY NODE AND METHOD FOR MANAGING INTERFERENCE IN A MULTI-HOP NETWORK

(75) Inventors: Won Jae Shin, Yongin-si (KR); Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 13/524,389

(22) Filed: Jun. 15, 2012

(65) Prior Publication Data

US 2013/0089023 A1   Apr. 11, 2013

(30) Foreign Application Priority Data

Oct. 5, 2011  (KR) .................. 10-2011-0101190

(51) Int. Cl.
*H04B 7/185* (2006.01)
*H04B 7/155* (2006.01)
*H04J 11/00* (2006.01)
*H04W 4/00* (2009.01)

(52) U.S. Cl.
CPC ............ *H04B 7/155* (2013.01); *H04J 11/0056* (2013.01)
USPC .......................................... 370/317; 370/328

(58) Field of Classification Search
None
See application file for complete search history.

(56) References Cited

U.S. PATENT DOCUMENTS

| | | | |
|---|---|---|---|
| 8,160,013 B2 * | 4/2012 | Kim et al. ..................... 370/329 |
| 2004/0028013 A1 * | 2/2004 | Fitton et al. ................... 370/335 |
| 2004/0242179 A1 * | 12/2004 | Onggosanusi et al. ....... 455/296 |
| 2009/0147728 A1 * | 6/2009 | Atia et al. ...................... 370/321 |
| 2010/0080323 A1 * | 4/2010 | Mueck et al. ................. 375/296 |
| 2011/0183692 A1 * | 7/2011 | Lee et al. ...................... 455/501 |
| 2011/0195704 A1 * | 8/2011 | Choi et al. .................... 455/423 |
| 2012/0076243 A1 * | 3/2012 | Gresset et al. ................ 375/320 |

FOREIGN PATENT DOCUMENTS

KR   10-2010-0099414 A   9/2010

* cited by examiner

*Primary Examiner* — Eunsook Choi
(74) *Attorney, Agent, or Firm* — NSIP Law

(57) ABSTRACT

A method and system of a relay node managing interference in a multi-hop network and a relay node that manages interference is provided. The relay node may determine whether an interference neutralization condition for neutralizing interference among pairs of transmitting nodes and receiving nodes is satisfied, select one of a full interference neutralization and a partial interference neutralization, based on a result of the determination and perform the selected interference neutralization with respect to the pairs of the transmitting nodes and the receiving nodes.

20 Claims, 7 Drawing Sheets

RELAY NODE AND METHOD FOR MANAGING INTERFERENCE IN A MULTI-HOP NETWORK

CROSS-REFERENCE TO RELATED APPLICATION(S)

This application claims the benefit under 35 U.S.C. §119(a) of Korean Patent Application No. 10-2011-0101190, filed on Oct. 5, 2011, in the Korean Intellectual Property Office, the entire disclosure of which is incorporated herein by reference for all purposes.

BACKGROUND

1. Field

The following description relates to a method of a relay node managing interference in a multi-hop network, and the relay node that manages interference in a communication system.

2. Description of Related Art

Communication systems are used to connect users to perform voice, video, text communication, and the like. It is estimated that at least one percent of all devices around the world may be connected to each other over a network. As advancements in communication technologies increase, this network is expected to expand. These communication technologies affect smart phones, sensor devices, and various other devices having different functions. Through these communication devices, users may readily share content, may perform synchronization and output, and may use various applications such as games, for example, through direct contact among the communication devices.

To adapt to various changes in the market, there is a need for wireless access technologies that support direct communication among devices, such as a device-to-device (D2D) communication, in addition to cellular communication based on conventional infrastructure.

A plurality of pairs of transmitting nodes and receiving nodes may simultaneously transmit signals using wireless access technologies. As a result, signals among the pairs of the transmitting nodes and the receiving nodes may affect each other as interference and deterioration in performance may occur.

SUMMARY

In one general aspect, there is provided a method of a relay node managing interference in a multi-hop network, the method including determining whether an interference neutralization condition to neutralize interference among pairs of transmitting nodes and receiving nodes is satisfied, selecting one of a full interference neutralization and a partial interference neutralization based on a result of the determination, and performing the selected interference neutralization with respect to the pairs of the transmitting nodes and the receiving nodes.

The method may further include determining whether an interference neutralization condition is satisfied is based on a number of relay nodes.

The method may further include removing interference by applying a rate splitting scheme with respect to a result of the partial interference neutralization, in response to the partial interference neutralization being selected.

The method may further include selecting the partial interference neutralization, and the partial interference neutralization further comprises performing of the partial interference neutralization to enable a number of transmitting nodes causing interference in each receiving node of the pairs of the transmitting nodes and the receiving nodes to be less than or equal to one.

The selecting may include selecting the full interference neutralization, in response to a number of relay nodes satisfying the interference neutralization condition.

The method may further include feeding back, to the transmitting nodes, information associated with a channel state after the partial interference neutralization is performed with respect to the pairs of the transmitting nodes and the receiving nodes.

The method may further include the information associated with the channel state after the partial interference neutralization is performed is composite channel state information indicating a value of an effective channel after the partial interference neutralization is performed.

The method may further include determining whether a number of relay nodes satisfies a partial interference neutralization condition for performing the partial interference neutralization with respect to the pairs of the transmitting nodes and the receiving nodes, and adjusting, based on a result of the determination, the number of relay nodes and a number of the pairs of the transmitting nodes and the receiving nodes that simultaneously transmit signals to the relay nodes.

The adjusting may include increasing the number of relay nodes up to $N \times (N-2)+1$, in response to the number of relay nodes not satisfying the partial interference neutralization condition for performing the partial interference neutralization with respect to the pairs of the transmitting nodes and the receiving nodes, N indicates the number of pairs of the transmitting nodes and the receiving nodes.

The adjusting may include decreasing, to floor($K^{1/2}+1$), the number of pairs of the transmitting nodes and the receiving nodes that simultaneously transmit signals to the relay nodes, in response to the number of relay nodes not satisfying the partial interference neutralization condition for performing the partial interference neutralization with respect to the pairs of the transmitting nodes and the receiving nodes, and k indicates the number of relay nodes.

In another aspect, there is provided a multi-hop network, the relay node including a determining unit configured to determine whether an interference neutralization condition for neutralizing interference among pairs of transmitting nodes and receiving nodes is satisfied, a selecting unit configured to select one of a full interference neutralization and a partial interference neutralization, based on a result of the determination, and a performing unit configured to perform the selected interference neutralization with respect to the pairs of the transmitting nodes and the receiving nodes.

The relay node may further include a removing unit configured to remove interference by applying a rate splitting scheme with respect to a result of the partial interference neutralization, in response to the partial interference neutralization being selected.

The relay node may further include, in response to the partial interference neutralization being selected, the performing unit is configured to perform the partial interference neutralization to enable a number of transmitting nodes causing interference in each receiving node of the pairs of the transmitting nodes and the receiving nodes to be less than or equal to one.

The relay node may further include the selecting unit is configured to select the full interference neutralization, in response to a number of relay nodes satisfying the interference neutralization condition.

The relay node may further include a feedback unit configured to feed back, to the transmitting nodes, information associated with a channel state after the partial interference neutralization is performed with respect to the pairs of the transmitting nodes and the receiving nodes.

The relay node may further include an adjusting unit, determining unit is configured to determine whether a number of relay nodes satisfies a partial interference neutralization condition for performing the partial interference neutralization with respect to the pairs of the transmitting nodes and the receiving nodes, and the adjusting unit is configured to adjust, based on the determination, the number of relay nodes or a number of the pairs of the transmitting nodes and the receiving nodes that simultaneously transmit signals to the relay nodes.

The adjusting unit may be configured to increase the number of relay nodes up to $N \times (N-2)+1$, in response to the number of relay nodes not satisfying the partial interference neutralization condition for performing the partial interference neutralization with respect to the pairs of the transmitting nodes and the receiving nodes, N is the number of pairs of the transmitting nodes and the receiving nodes.

The adjusting unit may be configured to decrease, to floor $(K^{1/2}+1)$, the number of pairs of the transmitting nodes and the receiving nodes that simultaneously transmit signals to the relay nodes, in response to the number of relay nodes not satisfying the partial interference neutralization condition for performing partial interference neutralization with respect to the pairs of the transmitting nodes and the receiving nodes, k is the number of relay nodes.

In another aspect, there is provided a terminal including at least one of a transmitting node and a receiving node, the at least one of the transmitting node and receiving node being configured to transmit a signal to a relay node in a multi-hop network, the relay node including a determining unit to determine whether an interference neutralization condition for neutralizing interference among pairs of transmitting nodes and receiving nodes is satisfied, a selecting unit to select one of a full interference neutralization and a partial interference neutralization, based on a result of the determination, and a performing unit to perform the selected interference neutralization with respect to the pairs of the transmitting nodes and the receiving nodes.

The terminal may be a mobile phone.

In another aspect, there is provided a computer-readable storage medium comprising instructions that, when executed by a computer, cause the computer to perform a method of a relay node managing interference in a multi-hop network, the method including determining whether an interference neutralization condition to neutralize interference among pairs of transmitting nodes and receiving nodes is satisfied, selecting one of a full interference neutralization and a partial interference neutralization based on a result of the determination, and performing the selected interference neutralization with respect to the pairs of the transmitting nodes and the receiving nodes.

Other features and aspects will be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

As described herein, a node such as a transmitting or a receiving node may be a terminal. As a non-limiting example, a terminal may be a mobile phone, a computer, a tablet, a server, a router, an appliance, and the like.

Figure 1:
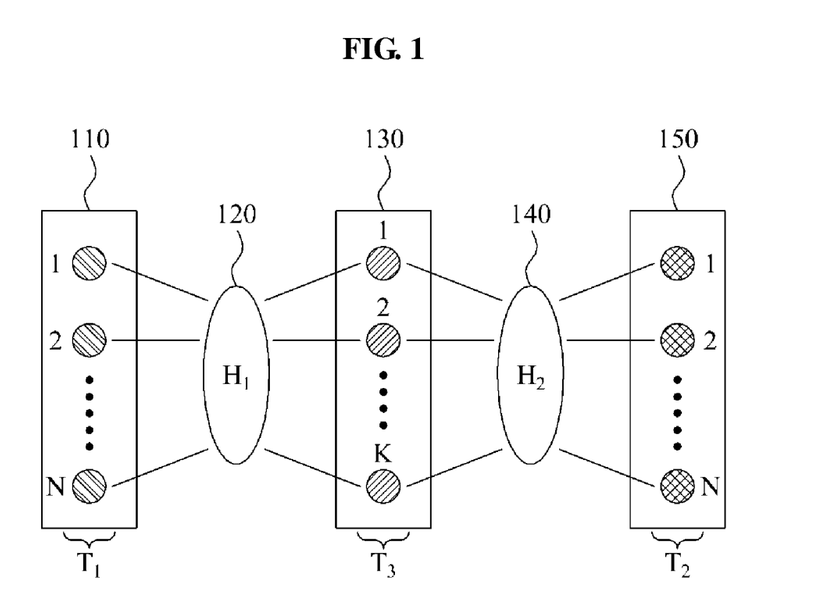
FIG. 1 is a diagram illustrating an example of a multi-hop network.

FIG. 1 illustrates an example of a multi-hop network.

Referring to FIG. 1, in the multi-hop network, a plurality of transmitting nodes 110 may transmit data to a plurality of receiving nodes 150 through a plurality of relay nodes 130. A cellular system is an example of the multi-hop network in which a plurality of users may transmit data to a plurality of base stations through a plurality of relays. In the example of FIG. 1, a channel between the plurality of transmitting nodes 110 and the plurality of relay nodes 130 is $H_1$ 120, and a channel between the plurality of relay nodes 130 and the plurality of receiving nodes 150 is $H_2$ 140.

A plurality of pairs of the transmitting nodes and the receiving nodes may simultaneously transmit signals. As a result, the signals or streams from different pairs of transmitting nodes and receiving nodes may be mixed during a multi-hop process and inter-stream interference may occur. This interference needs to be managed. Performing neutralization and reduction of interference among the pairs of the transmitting nodes and the receiving nodes manages the interference.

Various examples described herein relate to a method of a relay node managing interference in a multi-hop network.

Figure 2:
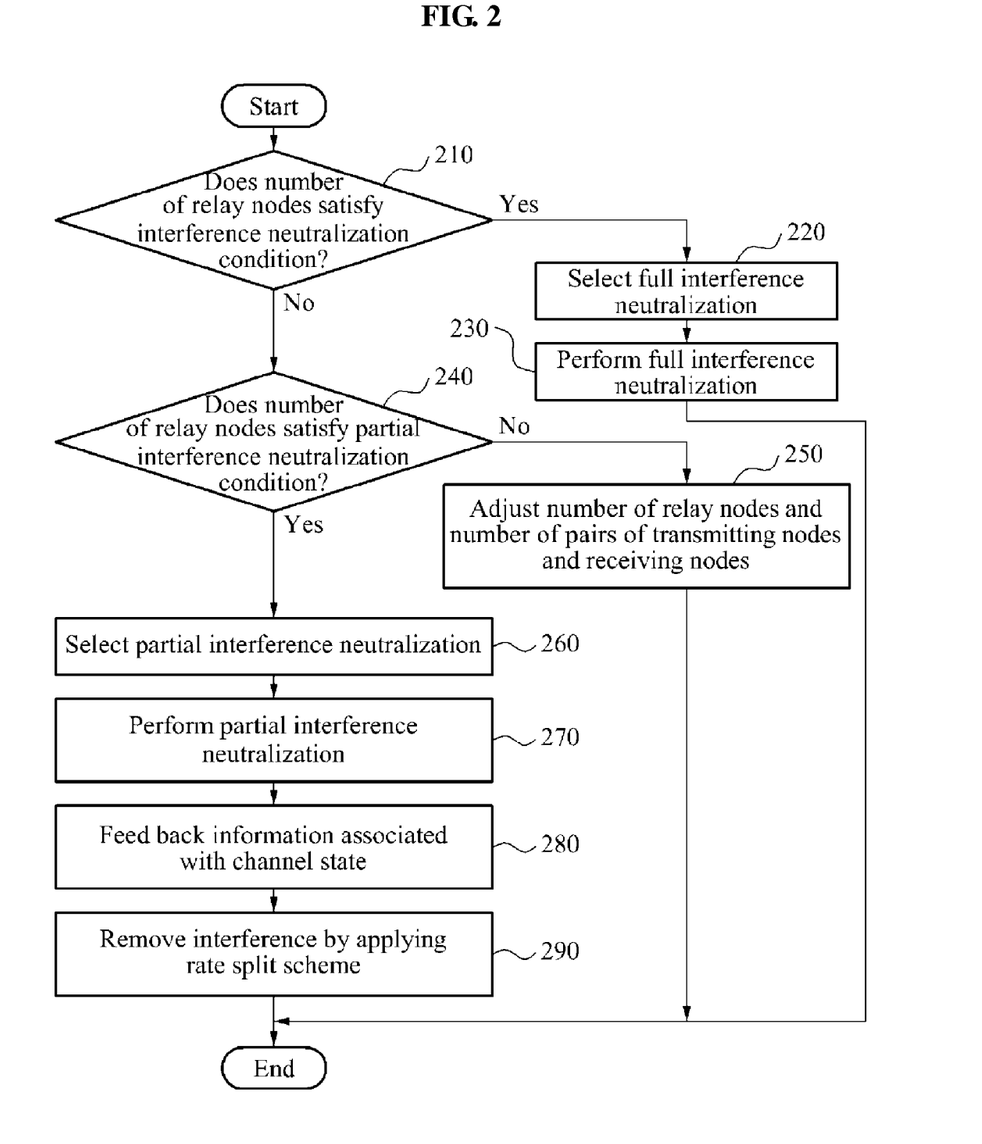
FIG. 2 is a flowchart illustrating an example of a method of a relay node managing interference in a multi-hop network.

FIG. 2 illustrates the method of the relay node managing interference in the multi-hop network. In this example, the network includes relay nodes and pairs of transmitting nodes and receiving nodes. Referring to FIG. 2, in 210, the relay node determines whether the multi-hop network satisfies an interference neutralization condition for performing neutralization interference among the pairs of the transmitting nodes and the receiving nodes. For example, the relay node may make the determination in 210 based on the number of relay nodes. For example, whether the interference neutralization condition is satisfied may be determined based on whether the number of relay nodes included in the multi-hop network satisfies Equation 1.

$$K_1 \geq ((N-1)N)+1 \qquad \text{[Equation 1]}$$

Hereinafter, the interference neutralization condition may be referred to as a full interference neutralization condition.

The relay node may select full interference neutralization and/or partial interference neutralization based on the determination in 210. The relay node may perform the selected interference neutralization with respect to the pairs of the transmitting nodes and the receiving nodes. An example of the full interference neutralization is described with reference to FIGS. 3 and 4, and an example of the partial interference neutralization is described with reference to FIG. 5.

In 220, the relay node selects the full interference neutralization, in response to the number of relay nodes included in the multi-hop network satisfying the interference neutralization condition for performing the full interference neutralization. The relay node performs the full interference neutralization with respect to the pairs of the transmitting nodes and the receiving nodes in 230, and a process of managing interference is completed.

Conversely, if the number of relay nodes included in the multi-hop network fails to satisfy the interference neutralization condition for performing the full interference neutralization in 210, the relay node determines whether the number of relay nodes satisfies a partial interference neutralization condition in 240. For example, whether the partial interference neutralization condition is satisfied may be determined based on whether the number of relay nodes included in the multi-hop network satisfies Equation 2.

$$K_2 \geq ((N-2)N)+1 \quad \text{[Equation 2]}$$

Here, N denotes a number of pairs of transmitting nodes and receiving nodes.

In response to the number of relay nodes satisfying the partial interference neutralization condition for performing the partial interference neutralization with respect to the pairs of the transmitting nodes and the receiving nodes, the relay node selects the partial interference neutralization in 260. The relay node performs the partial interference neutralization with respect to the pairs of the transmitting nodes and the receiving nodes in 270. For example, the relay node may perform the partial interference neutralization to enable a number of transmitting nodes causing interference in each receiving node of the pairs of the transmitting nodes and receiving nodes to be less than or equal to one.

An example in which the relay node controls interference using different schemes based on the number of relay nodes in the multi-hop network is described with reference to FIG. 6.

In response to the number of relay nodes not satisfying the partial interference neutralization condition, the relay node adjusts the number of relay nodes or a number of the pairs of transmitting nodes and receiving nodes that simultaneously transmit signals to relay nodes in 250.

For example, if the number of relay nodes does not satisfy the partial interference neutralization condition, the relay node may increase the number of relay nodes to N×(N−2)+1. Here, N denotes the number of pairs of the transmitting nodes and the receiving nodes. As another example, if the number of relay nodes does not satisfy the partial interference neutralization condition, the relay node may decrease the number of pairs of the transmitting nodes and the receiving nodes that simultaneously transmit signals to the relay nodes to floor $(K^{1/2}+1)$. Here, K denotes a smallest integer among integers less than A.

In 280, the relay node feeds back, to the transmitting nodes, information associated with a channel state after the partial interference neutralization is performed in 270. For example, the relay node may receive information associated with a channel, such as $H_1$, $H_2$, and the like. The transmitting nodes may receive information associated with the channel state after the partial interference neutralization, for example, H2GH1, shown in Equation 3, is performed, as opposed to $H_1$, $H_2$, and the like, and thus, overhead may be significantly reduced when compared to general interference control schemes.

$$H_2GH_1 = \begin{bmatrix} h_1^{(2)} \\ h_2^{(2)} \\ \vdots \\ h_N^{(2)} \end{bmatrix} \begin{bmatrix} g_1 & 0 & \cdots & 0 \\ 0 & g_2 & \cdots & 0 \\ \vdots & \vdots & \ddots & \vdots \\ 0 & 0 & \cdots & g_K \end{bmatrix} [h_1^{(1)} \ h_2^{(1)} \ \cdots \ h_N^{(1)}] \quad \text{[Equation 3]}$$

$$= \begin{bmatrix} h_1^{(2)} \\ h_2^{(2)} \\ \vdots \\ h_N^{(2)} \end{bmatrix} G [h_1^{(1)} \ h_2^{(1)} \ \cdots \ h_N^{(1)}]$$

$$= \begin{bmatrix} h_1^{(2)}G \\ h_2^{(2)}G \\ \vdots \\ h_N^{(2)}G \end{bmatrix} [h_1^{(1)} \ h_2^{(1)} \ \cdots \ h_N^{(1)}]$$

$$= \begin{bmatrix} h_1^{(2)}Gh_1^{(1)} & h_1^{(2)}Gh_2^{(1)} & \cdots & h_1^{(2)}Gh_N^{(1)} \\ h_2^{(2)}Gh_1^{(1)} & h_2^{(2)}Gh_2^{(1)} & \cdots & h_2^{(2)}Gh_N^{(1)} \\ \vdots & \vdots & \ddots & \vdots \\ h_N^{(2)}Gh_1^{(1)} & h_N^{(2)}Gh_2^{(1)} & \cdots & h_N^{(2)}Gh_N^{(1)} \end{bmatrix}$$

$$= \begin{bmatrix} \alpha_1 & 0 & \cdots & 0 \\ 0 & \alpha_2 & \cdots & 0 \\ \vdots & \vdots & \ddots & \vdots \\ 0 & 0 & \cdots & \alpha_N \end{bmatrix}$$

The information associated with the channel state after the partial interference neutralization is performed may be, for example, composite channel state information indicating a value of an effective channel after the partial interference neutralization is performed, as shown in the right matrix of Equation 4.

$$\begin{bmatrix} h_1^{(2)}Gh_1^{(1)} & h_1^{(2)}Gh_2^{(1)} & \cdots & h_1^{(2)}Gh_N^{(1)} \\ h_2^{(2)}Gh_1^{(1)} & h_2^{(2)}Gh_2^{(1)} & \cdots & h_2^{(2)}Gh_N^{(1)} \\ \vdots & \vdots & \ddots & \vdots \\ h_N^{(2)}Gh_1^{(1)} & h_N^{(2)}Gh_2^{(1)} & \cdots & h_N^{(2)}Gh_N^{(1)} \end{bmatrix} = \begin{bmatrix} \alpha_{11} & 0 & \cdots & 0 \\ \alpha_{21} & \alpha_{22} & \cdots & 0 \\ 0 & \alpha_{32} & \ddots & \vdots \\ 0 & 0 & \cdots & \alpha_{NN} \end{bmatrix} \quad \text{[Equation 4]}$$

In response to the partial interference neutralization being selected, the relay node may apply a rate splitting scheme to a result of the partial interference neutralization so as to remove remaining interference in 290.

An example of performing neutralization and cancellation of interference when the number of relay nodes satisfies the partial interference neutralization condition in the multi-hop network is described with reference to FIG. 5.

Figure 3:
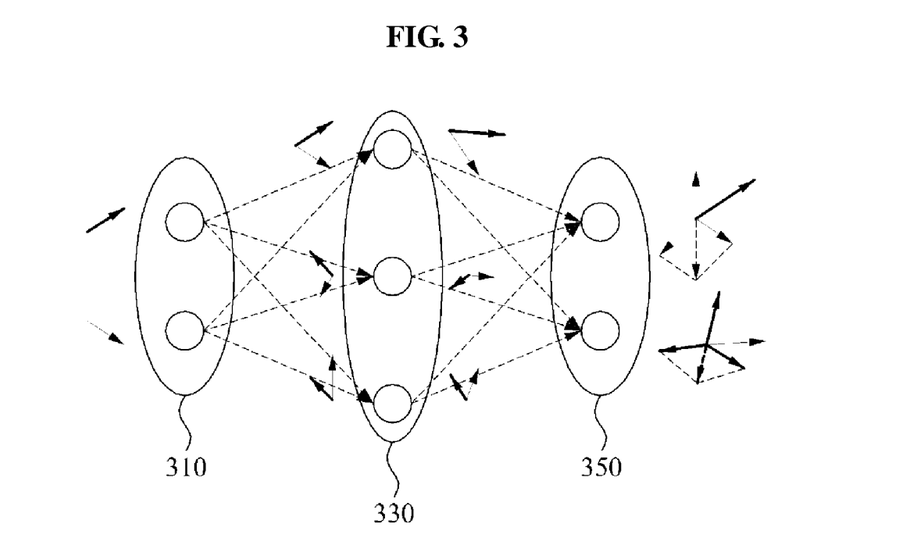
FIG. 3 is a diagram illustrating an example of an interference neutralization performed in a multi-hop network.

FIG. 3 illustrates an example of an interference neutralization performed in a multi-hop network.

The interference neutralization is first introduced from a multiple uni-cast multi-hop network. The following examples illustrate this concept. Referring to FIG. 3, all relay nodes 330 in the multi-hop network may perform amplifying and forwarding. $H_1$ and $H_2$, not shown in FIG. 3, denote a channel between transmitting nodes 310 and relay nodes 330, and a channel between relay nodes 330 and receiving nodes 350, respectively. An amplifying coefficient multiplied by a channel used by the relay nodes 330 in the multi-hop network may be expressed by a G matrix.

In this example, all nodes included in the multi-hop network may have a uni-antenna, and the G matrix may be a diagonal matrix. An effective channel gain from the transmitting nodes 310 to the receiving nodes 350, to which signals are transferred through a relay operation, are expressed by Equation 3. In this example, for the interference neutralization, inter-stream interference may be removed completely, and thus, the G matrix may be designed to enable the effective channel gain to be a diagonal matrix as shown in Equation 3.

Equation 3 may be modified to Equation 5 and Equation 6 based on a feature of linear algebra.

$$\Leftrightarrow \begin{bmatrix} g_1 \\ g_2 \\ \vdots \\ g_N \end{bmatrix}^T \underbrace{\begin{bmatrix} h_1^{(2)T} \circ h_2^{(1)} & \cdots & h_1^{(2)T} \circ h_N^{(1)} & h_2^{(2)T} \circ h_1^{(1)} & \cdots \\ h_2^{(2)T} \circ h_N^{(1)} & h_N^{(2)T} \circ h_1^{(1)} & \cdots & h_N^{(2)T} \circ h_{N-1}^{(1)} \end{bmatrix}}_{K \times (N-1)N} = \quad \text{[Equation 5]}$$

$$[0 \ 0 \ \cdots \ 0]$$

$$\begin{pmatrix} \because a^T G b = [a_1 \ \cdots \ a_N] \begin{bmatrix} g_1 & 0 & \cdots & 0 \\ 0 & g_2 & \cdots & 0 \\ \vdots & \vdots & \ddots & \vdots \\ 0 & 0 & \cdots & g_K \end{bmatrix} \begin{bmatrix} b_1 \\ \vdots \\ b_N \end{bmatrix} = \\ [a_1 g_1 \ a_2 g_2 \ \cdots \ a_N g_N] \begin{bmatrix} b_1 \\ \vdots \\ b_N \end{bmatrix} = \\ \sum_{i=1}^{N} a_i b_i g_i = [a_1 b_1 \ a_2 b_2 \ \cdots \ a_N b_N] \begin{bmatrix} g_1 \\ \vdots \\ g_N \end{bmatrix} \end{pmatrix} \quad \text{[Equation 6]}$$

Accordingly, an interference neutralization condition obtainable from Equations described in the foregoing may be expressed by Equation 1.

$$K_1 \geq ((N-1)N)+1 \quad \text{[Equation 1]}$$

Referring again to Equation 1, $K_1$ denotes a minimum number of relay nodes required for performing a full interference neutralization if N pairs of transmitting nodes and receiving nodes transmit corresponding signals to a multi-hop.

For example, if the number of pairs of transmitting nodes 310 and receiving nodes 350 included in the multi-hop network is two, it is determined that $K_1 = N \times (N-1)+1 = 3$ based on Equation 1.

Figure 4:
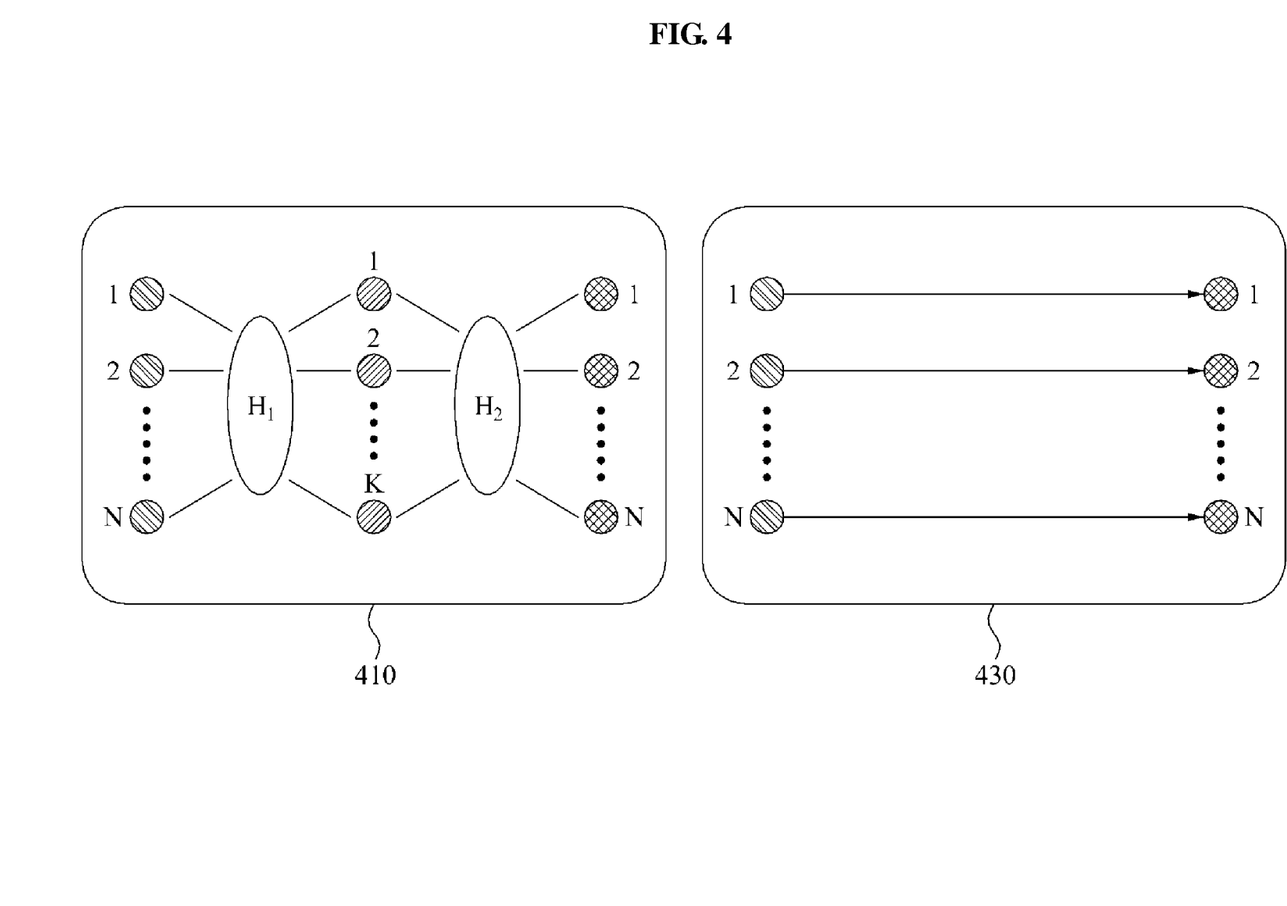
FIG. 4 is a diagram illustrating an example of an effect obtained by performing an interference neutralization in a multi-hop network.

FIG. 4 illustrates an example of an effect obtained by performing an interference neutralization in a multi-hop network.

Referring to FIG. 4, if the relay nodes 330 perform amplifying and forwarding and interference neutralization as illustrated in the foregoing, an interfering multi-hop network having a topology 410 may be expressed by a single-hop network 430 in which a transmitting node and a receiving node are equivalent. In addition, all interference on the channel may be removed, and as a result, the single-hop network 430 may resemble a multi-peer-to-peer network.

With reference back to FIG. 3, interference neutralization may offset interference in signals received by the receiving nodes, 350, although the signals transmitted from the transmitting nodes 310 through each channel act as interference to each other while passing through the relay nodes 330, so that the receiving nodes 350 may receive signals excluding interference.

Figure 5:
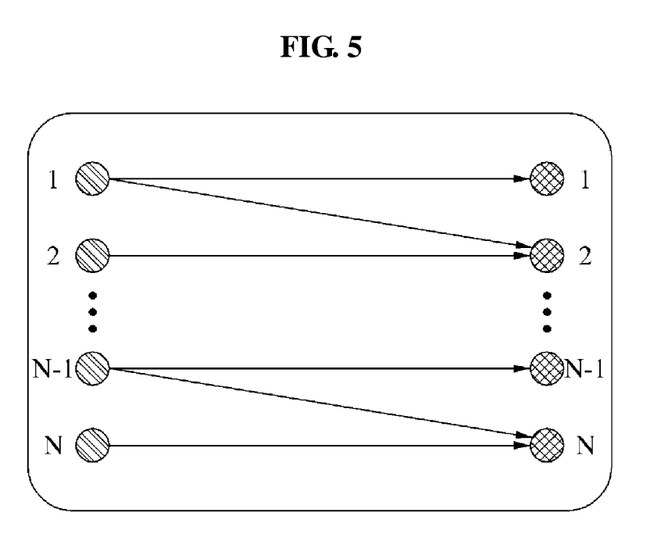
FIG. 5 is a diagram illustrating an example of a partial interference neutralization.

FIG. 5 illustrates an example of a partial interference neutralization.

Referring to FIG. 5, partial interference neutralization may be used when a full interference neutralization is not performed because the number of relay nodes corresponds to $K<((N-1)N)+1$, where K indicates the number of relay nodes.

In a single-hop interfering network, interference may be removed by a Han-Kobayashi rate splitting scheme. However, the Han-Kobayashi rate splitting scheme may have a limitation in that at least one interference affects a single receiving node, such that restoration of a signal is difficult.

Various examples herein provide an interference managing scheme that is available even if a number of relay nodes in a multi-hop network is insufficient to perform the full interference neutralization.

For example, if the number of relay nodes in the multi-hop network is insufficient to perform the full interference neutralization, the relay nodes may maximally perform interference neutralization so as to make an off-diagonal element of an effective channel gain be equal to 0. Subsequently, the relay nodes may make a number of remaining off-diagonal elements to be less than or equal to one per column, which is referred to as the partial interference neutralization.

After performing the partial interference neutralization, the relay nodes may remove remaining interference based on the rate splitting scheme, which is the interference managing scheme used in the single-hop network. The above-described scheme may be referred to as an interference neutralization and cancellation (INC).

The effective channel gain when the INC is used may be expressed by Equation 4.

Also, a minimum number of relay nodes required for performing the INC may be expressed by Equation 2.

Although the full interference neutralization requires H2GH1 to be a diagonal matrix, the INC may allow a maximum of a single interference. The INC may leave a maximum of one of off-diagonal elements per column, as opposed to setting it to 0. Accordingly, interference may be controlled merely using a number of relay nodes that satisfy Equation 2.

In this example, an N-user cascade Z-interference channel may be formed in the partial interference neutralization, as illustrated in FIG. 5. A maximum of a single interference excluding a signal may affect all receiving nodes. In this manner, interference may be controlled based on the rate splitting scheme, which is an interference control scheme used in the single-hop network.

Figure 6:
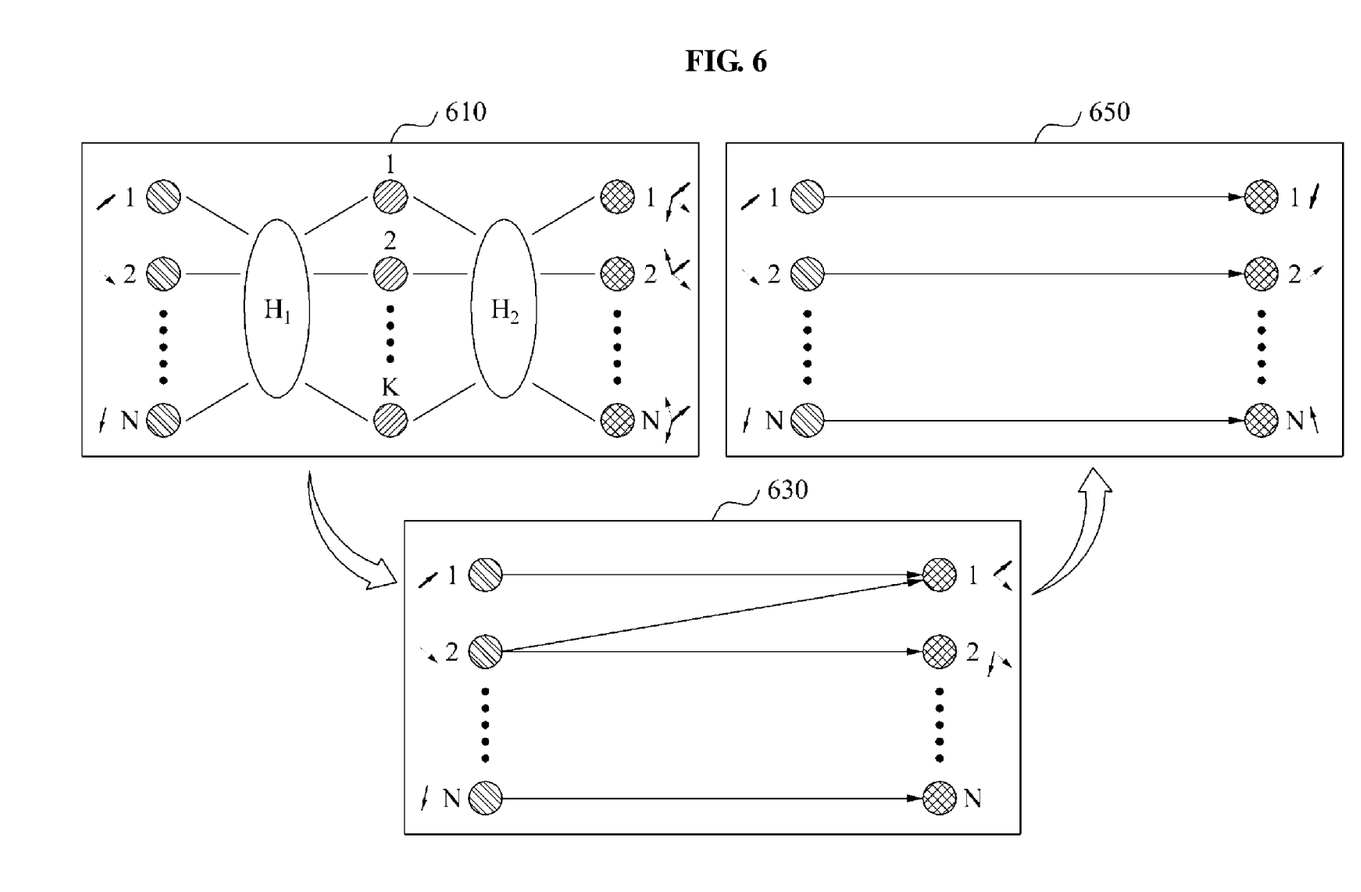
FIG. 6 is a diagram illustrating an example of a process that controls interference using different schemes based on a number of relay nodes in a multi-hop network.

FIG. 6 illustrates an example of a process that controls interference using different schemes based on a number of relay nodes in a multi-hop network.

Referring to FIG. 6, if the number of relay nodes included in the multi-hop network satisfies $K \geq ((N-1)N)+1$, which is a condition for performing a full interference neutralization, a relay node may perform the full interference neutralization so as to alter a topology 610 to be a single-hop network 650 in which a transmitting node and a receiving node are equivalent.

Conversely, if the number of relay nodes included in the multi-hop network corresponds to $(N-1)N+1 > K \geq ((N-2)N)+1$, that is, if the number of relay nodes is insufficient to perform the full interference neutralization but is sufficient to perform the partial interference neutralization, the relay node may perform an INC.

In an example in which the partial interference neutralization is performed with respect to the topology 610 using an interference controlling scheme in the multi-hop, an N-user cascade Z-interference channel may be formed as shown in a topology 630. In this example, a maximum of single interference, excluding a signal, may affect all receiving nodes in the topology 630. Subsequently, the rate splitting scheme, which is an interference controlling scheme in a single-hop, may be applied to the topology 630 so that remaining interference may be controlled.

The relay node may increase the number of relay nodes or may adjust a number of pairs of transmitting nodes and receiving nodes that simultaneously transmit signals if the number of relay nodes corresponds to K<(N−2)N+1 and is insufficient to perform the partial interference neutralization.

For example, a minimum number of relay nodes may be reduced to a value of N, when compared to the full interference neutralization.

For example, when N=3, at least seven relay nodes may be required based on N×(N−1)+1=3×(2)+1=7, to perform full interference neutralization with respect to the pairs of the transmitting nodes and the receiving nodes. As another example, the INC may provide an equivalent performance with only four relay nodes, that is, N×(N−2)+1=3×(1)+1=4.

Figure 7:
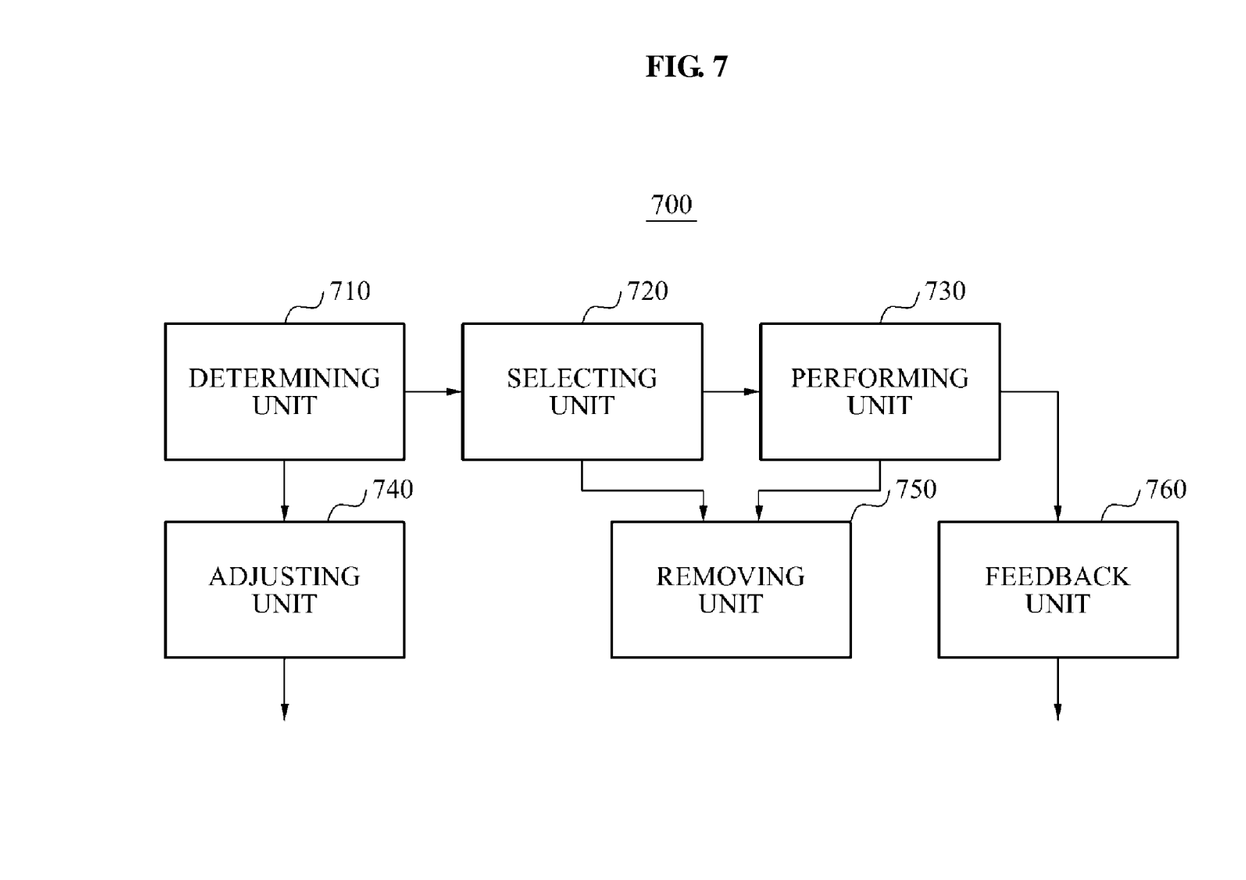
FIG. 7 is a diagram illustrating an example of a relay node managing interference in a multi-hop network.

FIG. 7 illustrates an example of a relay node managing interference in a multi-hop network.

Referring to FIG. 7, relay node 700 includes a determining unit 710, a selecting unit 720, a performing unit 730, an adjusting unit 740, a removing unit 750, and a feedback unit 760.

The determining unit 710 may determine whether an interference neutralization condition for neutralizing interference among pairs of transmitting nodes and receiving nodes is satisfied, based on a number of the relay nodes.

The selecting unit 720 may select full interference neutralization or a partial interference neutralization, based on a result of the determination. For example, the selecting unit 720 may select the full interference neutralization if the number of relay nodes satisfies the interference neutralization condition.

The performing unit 730 may perform the selected interference neutralization with respect to the pairs of the transmitting nodes and the receiving nodes. For example, if the partial interference neutralization is selected, the performing unit 730 may perform the partial interference neutralization to enable a number of transmitting nodes causing interference in each receiving node of the pairs of the transmitting nodes and the receiving nodes to be less than or equal to one.

As another example, the determining unit 710 may determine whether the number of relay nodes satisfies a partial interference neutralization condition for performing the partial interference neutralization with respect to the pairs of the transmitting nodes and the receiving nodes. In this example, the adjusting unit 740 may adjust the number of relay nodes or a number of pairs of transmitting nodes and receiving nodes that simultaneously transmit signals to the relay nodes, based on a result of the determination of the determining unit 710.

For example, the adjusting unit 740 may increase the number of relay nodes up to N×(N−2)+1 if the number of relay nodes does not satisfy the partial interference neutralization condition for performing the partial interference neutralization with respect to the pairs of the transmitting nodes and the receiving nodes. In this example, N denotes the number of pairs of the transmitting nodes and the receiving nodes.

The adjusting unit 740 may decrease the number of pairs of transmitting nodes and receiving nodes that simultaneously transmit signals to the relay nodes if the number of relay nodes fails to satisfy the partial interference neutralization condition for performing partial interference neutralization with respect to the pairs of the transmitting nodes and the receiving nodes. For example, the adjusting unit may decrease the number of pairs of transmitting and receiving nodes to floor($K^{1/2}+1$). In this example, K denotes the number of relay nodes.

If the selecting unit 720 selects the partial interference neutralization, the removing unit 750 may remove interference by applying a rate splitting scheme with respect to a result of the partial interference neutralization performed by the performing unit 730.

The feedback unit 760 may feed back, to transmitting nodes, information associated with a channel state after the partial interference neutralization is performed with respect to the pairs of the transmitting nodes and the receiving nodes.

According to various examples herein, varied transmission schemes may be selected based on whether a number of relay nodes satisfies a full interference neutralization condition or a partial interference neutralization condition and thus, a transmission efficiency in a multi-hop network may be increased.

According to various examples herein, a partial interference neutralization may be performed with respect to pairs of transmitting nodes and receiving nodes in a multi-hop network so as to maximally control interference in a multi-hop, and may remove remaining interference using a rate splitting scheme so as to minimize a number of relay nodes required for an INC.

According to various examples herein, a relay node may feed back, to a transmitting node, information associated with a channel state after a partial interference neutralization is performed, and may reduce overhead by controlling of interference.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the are to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of a relay node managing interference in a multi-hop network, the method comprising:
determining, by comparing a number of relay nodes included in the network to a value calculated based on a number of pairs of transmitting nodes and receiving nodes included in the network, whether an interference neutralization condition to neutralize interference among the pairs of transmitting nodes and receiving nodes is satisfied;
selecting one of a full interference neutralization and a partial interference neutralization based on a result of the determination; and
performing the selected interference neutralization with respect to the pairs of transmitting nodes and receiving nodes.

2. The method of claim 1, further comprising:
removing interference by applying a rate splitting scheme with respect to a result of the partial interference neutralization, in response to the partial interference neutralization being selected.

3. The method of claim 1, further comprising:
selecting the partial interference neutralization,
wherein the partial interference neutralization further comprises performing of the partial interference neutralization to enable a number of transmitting nodes causing interference in each receiving node of the pairs of transmitting nodes and receiving nodes to be less than or equal to one.

4. The method of claim 1, wherein the selecting comprises:
selecting the full interference neutralization, in response to the number of relay nodes included in the network satisfying the interference neutralization condition.

5. The method of claim 1, further comprising:
feeding back, to the transmitting nodes, information associated with a channel state after the partial interference neutralization is performed with respect to the pairs of transmitting nodes and receiving nodes.

6. The method of claim 5, wherein the information associated with the channel state after the partial interference neutralization is performed is composite channel state information indicating a value of an effective channel after the partial interference neutralization is performed.

7. The method of claim 1, further comprising:
determining whether the number of relay nodes included in the network satisfies a partial interference neutralization condition for performing the partial interference neutralization with respect to the pairs of the transmitting nodes and the receiving nodes; and
adjusting, based on a result of the determination, the number of relay nodes and a number of the pairs of the transmitting nodes and the receiving nodes that simultaneously transmit signals to the relay nodes.

8. The method of claim 7, wherein the adjusting comprises:
increasing the number of relay nodes up to $N \times (N-2)+1$, in response to the number of the relay nodes not satisfying the partial interference neutralization condition for performing the partial interference neutralization with respect to the pairs of the transmitting nodes and the receiving nodes,
wherein N indicates the number of pairs of the transmitting nodes and the receiving nodes included in the network.

9. The method of claim 7, wherein the adjusting comprises:
decreasing, to $\text{floor}(K^{1/2}+1)$, a number of pairs of the transmitting nodes and the receiving nodes that simultaneously transmit signals to the relay nodes, in response to the number of relay nodes included in the network not satisfying the partial interference neutralization condition for performing the partial interference neutralization with respect to the pairs of transmitting nodes and receiving nodes,
wherein k indicates the number of relay nodes included in the network.

10. A relay node for managing interference in a multi-hop network, the relay node comprising:
a processor configured to control one or more processor-executable units;
a determining unit configured to determine, by comparing a number of relay nodes included in the network to a value calculated based on a number of pairs of transmitting nodes and receiving nodes included in the network, whether an interference neutralization condition for neutralizing interference among the pairs of transmitting nodes and receiving nodes is satisfied;
a selecting unit configured to select one of a full interference neutralization and a partial interference neutralization, based on a result of the determination; and
a performing unit configured to perform the selected interference neutralization with respect to the pairs of transmitting nodes and receiving nodes.

11. The relay node of claim 10, further comprising:
a removing unit configured to remove interference by applying a rate splitting scheme with respect to a result of the partial interference neutralization, in response to the partial interference neutralization being selected.

12. The relay node of claim 10, wherein, in response to the partial interference neutralization being selected, the performing unit is configured to perform the partial interference neutralization to enable a number of transmitting nodes causing interference in each receiving node of the pairs of transmitting nodes and receiving nodes to be less than or equal to one.

13. The relay node of claim 10, wherein the selecting unit is configured to select the full interference neutralization, in response to the number of relay nodes included in the network satisfying the interference neutralization condition.

14. The relay node of claim 10, further comprising:
a feedback unit configured to feed back, to the transmitting nodes, information associated with a channel state after the partial interference neutralization is performed with respect to the pairs of transmitting nodes and receiving nodes.

15. The relay node of claim 10, further comprising
an adjusting unit, wherein
the determining unit is configured to determine whether the number of relay nodes included in the network satisfies a partial interference neutralization condition for performing the partial interference neutralization with respect to the pairs of transmitting nodes and receiving nodes, and
the adjusting unit is configured to adjust, based on the determination, the number of relay nodes included in the network or a number of the pairs of transmitting nodes and receiving nodes that simultaneously transmit signals to the relay nodes.

16. The relay node of claim 15, wherein the adjusting unit is configured to increase the number of relay nodes up to $N\times(N-2)+1$, in response to the number of relay nodes not satisfying the partial interference neutralization condition for performing the partial interference neutralization with respect to the pairs of transmitting nodes and receiving nodes,
wherein N is the number of the pairs of the transmitting nodes and the receiving nodes.

17. The relay node of claim 15, wherein the adjusting unit is configured to decrease, to $floor(K^{1/2}+1)$, the number of the pairs of transmitting nodes and receiving nodes that simultaneously transmit signals to the relay nodes, in response to the number of relay nodes not satisfying the partial interference neutralization condition for performing partial interference neutralization with respect to the pairs of transmitting nodes and receiving nodes,
wherein k is the number of relay nodes.

18. A terminal including at least one of a transmitting node and a receiving node, the at least one of the transmitting node and receiving node being configured to transmit a signal to a relay node in a multi-hop network, the relay node comprising:
a determining unit to determine, by comparing a number of relay nodes included in the network to a value calculated based on a number of pairs of transmitting nodes and receiving nodes included in the network whether an interference neutralization condition for neutralizing interference among the pairs of transmitting nodes and receiving nodes is satisfied;
a selecting unit to select one of a full interference neutralization and a partial interference neutralization, based on a result of the determination; and
a performing unit to perform the selected interference neutralization with respect to the pairs of transmitting nodes and receiving nodes.

19. The terminal of claim 18, wherein the terminal is a mobile phone.

20. A non-transitory computer-readable storage medium comprising instructions that, when executed by a computer, cause the computer to perform a method of a relay node managing interference in a multi-hop network, the method comprising:
determining, by comparing a number of relay nodes included in the network to a value calculated based on a number of pairs of transmitting nodes and receiving nodes included in the network, whether an interference neutralization condition to neutralize interference among the pairs of transmitting nodes and receiving nodes is satisfied;
selecting one of a full interference neutralization and a partial interference neutralization based on a result of the determination; and
performing the selected interference neutralization with respect to the pairs of transmitting nodes and receiving nodes.

* * * * *